Sept. 15, 1970     I. B. ROSE     3,528,577
LIFT AND DUMP DEVICE
Filed Aug. 13, 1968     2 Sheets-Sheet 1
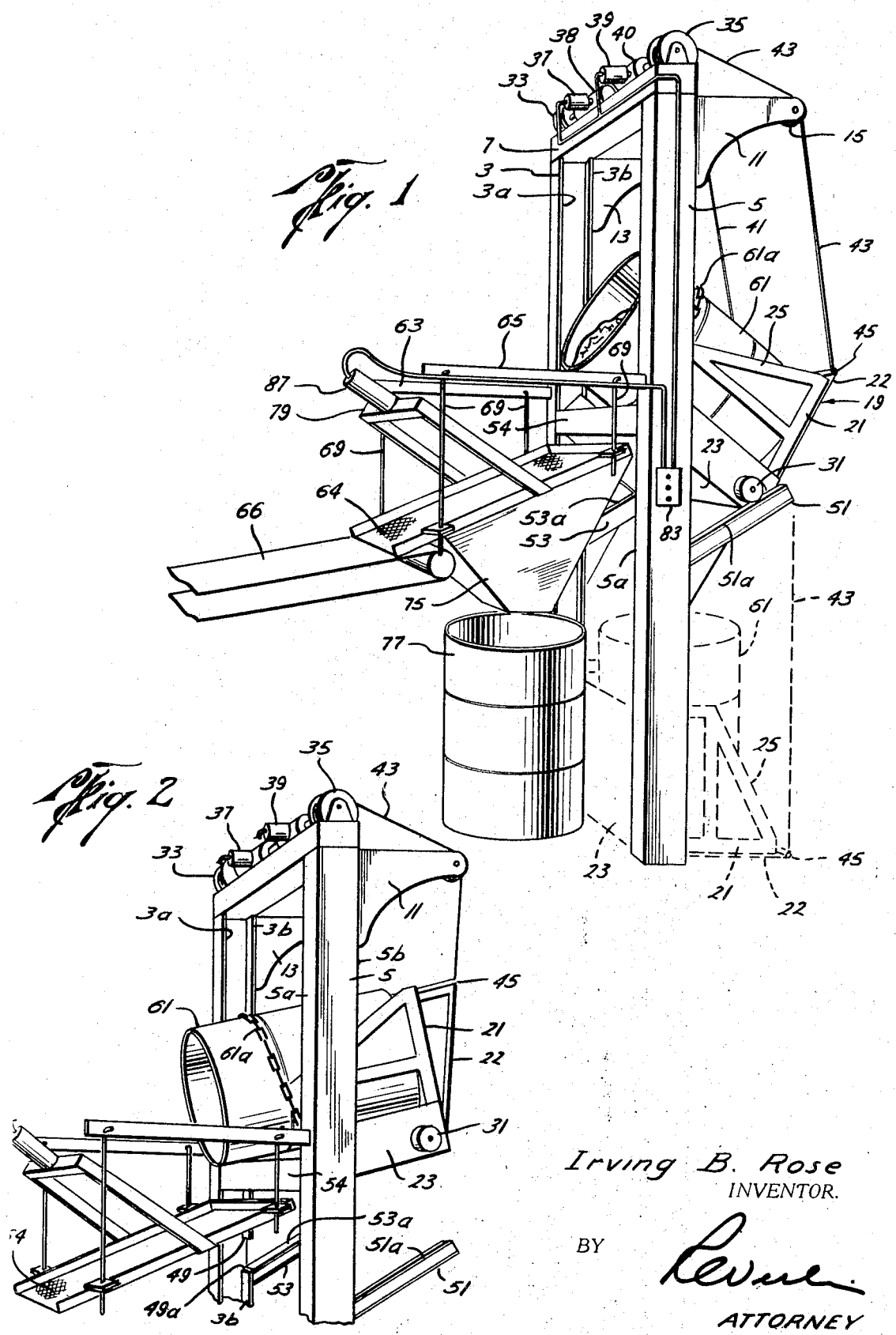
Irving B. Rose
INVENTOR.
BY
ATTORNEY Sept. 15, 1970      I. B. ROSE      3,528,577
LIFT AND DUMP DEVICE
Filed Aug. 13, 1968      2 Sheets-Sheet 2
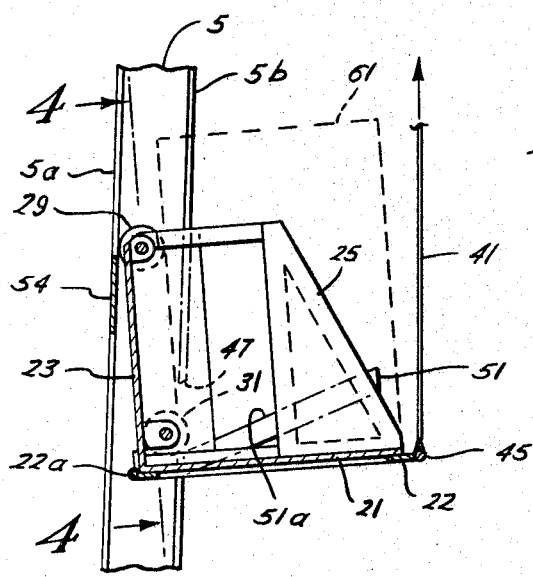
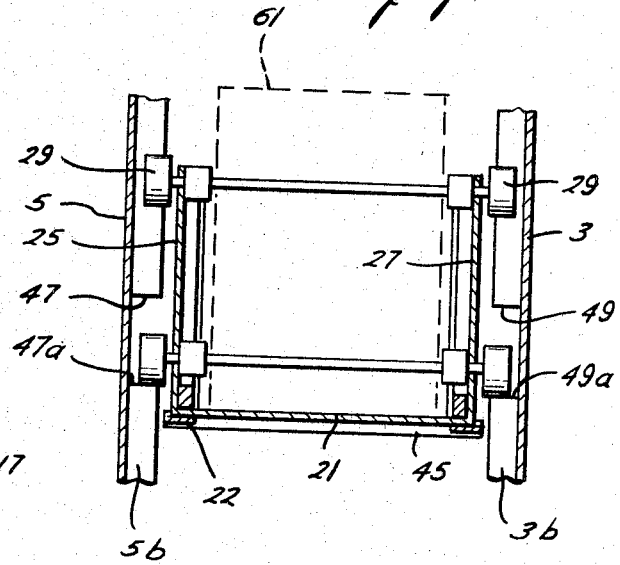
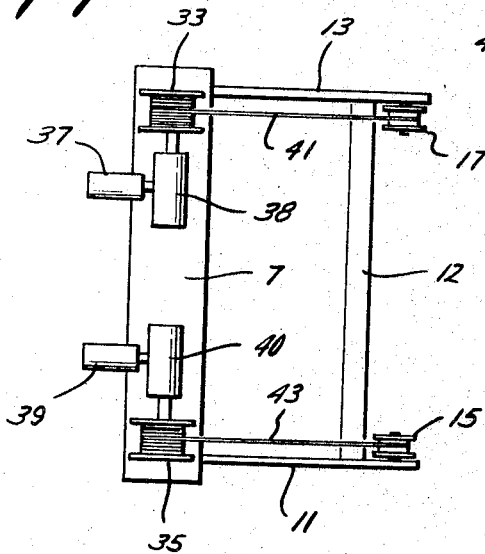
Irving B. Rose
INVENTOR.
BY
ATTORNEY United States Patent Office 3,528,577
Patented Sept. 15, 1970

3,528,577
LIFT AND DUMP DEVICE
Irving B. Rose, 4135 Mischire St., Houston, Tex. 77025
Filed Aug. 13, 1968, Ser. No. 752,373
Int. Cl. B65b 69/00
U.S. Cl. 214—313
8 Claims

ABSTRACT OF THE DISCLOSURE

A lift and dump device for raising and lowering material containers between a loading elevation and a dumping elevation and including means for automatically tilting the container to a dumping angle as it attains the dumping elevation.

BACKGROUND OF THE INVENTION

Heretofore a variety of lift and dump machines have been utilized in commercial and industrial application, where in the manufacturing sequence, there exists a necessity to move material containers from a first level at which the containers are filled, to a second where the material is generally removed from the container, such as by dumping. Subsequently, the container is returned to the first level for refilling and the sequence is repeated. Such mechanisms are well known as for example in the sand and gravel industry where continuously moving, endless type conveyor belts carry a plurality of spaced scoop shovels or buckets which are loaded at a first leve land carried to a second level where the material is dumped by reason of pivotal movements of the shovels about the belt upper axis. In other type applications, however, it is frequently desirable to eject the material from the containers at the second level in a more controlled manner, such as where the material is being fed into a subsequent processing machine of predetermined intake rate or where a manual separation and/or inspection operation is performed on the material that is being dumped. In order to effectively control the rate of dumping of the material from the container at the second level, incremental control over angular movement of the containers to the dumping position is essential. Such incremental control is difficult to obtain with endless belt devices because the movement arc of the container is necessarily dependent on the radius of the belt wheel and the velocity of the belt. Since the radius remains constant, the velocity of the belt about the radius axis becomes the sole means of controlling the turning or dumping rate of the container.

A variation of the endless belt lift and dump mechanism is a reciprocal up and down movement lift and dump elevator such as disclosed herein. This machine embodies an elevator like platform which is driven from a first loading level to a second dumping level. The dumping function is initiated by rotation of the container near the peak of the upward stroke. Unlike the endless belt devices the reciprocal lift and dump herein does not rotate about a single belt-wheel axis but instead the axis about which the container turns is itself movable. By thus controlling the rotational velocity of the container while permitting vertical movement of the turning axis, more sophisticated control of incremental dumping movements is made possible. Ease of operation and simplicity of construction further characterize the improved lift and dump mechanism described herein.

Since the lift and dump type machine is commonly used in conjunction with a subsequent processing station, the two are frequently constructed in integral form, particularly when the dumping rate is governed by the feed or processing rate of the subsequent station. An example of such an integrated construction is set forth hereinafter in the form of a vibrator table which may serve to separate the material being processed according to size or weight; or, it may take the form of a moving screen for simply separating dirt, dust or other refuse from the material which is being processed. The lift and dump mechanism used in conjunction with the vibration table herein may find particular application as a manually operated mechanically loaded sorter or cleaner such as may be found in the scrap metal industry. It will be readily recognized, however, that the lift and dump mechanism itself has versatile application with a large variety of different processing stations.

In the scrap metal recovery industry, the separating, sorting and cleaning of metal scrap, particularly of the more valuable non-ferrous metals, is an important operation, and usually involves the collection of the raw scrap in containers such as barrels, which must then be brought to sorting and cleaning stations where the crude scrap is dumped onto sorting tables, shakers and the like for the necessary further processing.

The handling of the heavy containers of such crude scrap at the processing stations by conventional methods is a slow, time-consuming, labor-wasting operation and the present invention has for its principal objects the provision of a mechanical lifting and dumping device which obviates the difficulties and problems attendant upon more conventional procedures; provides a lift device for raising containers of material to be processed to a desired dumping elevation at which the container is automatically tilted to an angle at which the contents of the container will be rapidly and completely discharged on to a shaker, sorting table or the like.

The device in accordance with the present invention comprises a motor driven, load carrying elevator platform movably supported by a carriage mounted on vertically spaced sets of upper and lower wheels. The carriage carrying the elevator platform is adapted to move within a substantially vertical frame which includes track means in which the upper and lower wheels are guided. The carriage is moved up and down the track means by a lifting cable connected at one end to an edge of the platform remote from the frame and at the other end to a rotating motor driven cable drum. Intermediate the upper and lower ends of the vertical frame, a second or tilitng track means extends outwardly and upwardly at an angle to the frame so that as the platform ascends the frame the lower wheels of the carriage will roll outwardly onto the tilting track portion, thus imparting to the carriage and platform a rotational movement of the upper end of the carriage about the axis of the upper wheels which, as lifting force is continued to be applied to the outer edge of the platform, will increase the tilting angle to a point at which the load carried on the platform will be discharged quickly and completely.

In the light of the above, reference may be made to the following detailed description, claims and drawings, wherein a preferred embodiment of the invention is shown and in which like numerals denote like parts in the several views. In the drawings;

FIG. 1 is a perspective view of the lift and dump mechanism of the invention showing the initial stage of tilting of the container into the dump position.

FIG. 2 shows the lift and dump mechanism of FIG. 1 after the container has reached the full dump position.

FIG. 3 is a side view of the elevator carriage of the invention prior to initiation of the tipping movement.

FIG. 4 illustrates a sectional view of the mechanism of FIG. 3 along the plane 4—4 thereof.

FIG. 5 illustrates a top view of the mechanism of FIG. 1.

With reference to the drawings, the lift and dump mechanism shown therein includes a pair of substantially vertical parallel channel members 3, 5 affixed to one another at the top thereof by the horizontal structural beam 7. Each of the channel members is rigidly supported in the floor such as by a concrete foundation. Each of the channel members 3, 5 is characterized by inwardly directed, spaced apart flanges 3a, 3b and 5a. The flanges 3a, 3b and 5a, 5b thus define a recessed track means in each of the respective channel members 3, 5.

Adapted to run within the channels and roll upon the flanges 3a, 3b and 5a, 5b is an elevator carriage generally designated 19. The elevator carriage is characterized by a floor plate 21 and a forward wall plate 23 disposed in substantially normal relationship to one another. The floor plate and wall plate 21, 23, respectively, may be structurally braced to one another by bracing plates 25, 27. The elevator carriage 19 is characterized by upper and lower sets of wheels 29 and 31, respectively. Each of the wheels 29, 31 is rotatably mounted to the elevator carriage along the side edges of wall plate 23 in order that they may engage and roll on the track means formed by the channel flanges 3a, 3b and 5a, 5b, respectively.

Extending rearwardly from the top of each of the respective vertical channel members 3, 5 is a cantilevered pulley arm 11, 13, connected by a cross brace 12. The pulley arms have rotatably mounted thereon pulley members 15 and 17, respectively. Also mounted at the top of the vertical channel members 3, 5 is a pair of cable take-up drums 33, 35, each of the take-up drums being positioned substantially on the longitudinal axis of the pulley arms 11, 13. The rotational axis of the cable take-up drums 33, 35 should be substantially perpendicular to the longitudinal axis of the pulley arms. Also disposed on the top of horizontal structural beam 7 is a pair of syncronized, reversible drive motors 37, 39. The drive motors are operationally connected through conventional gear boxes 38, 40, respectively, to their respective cable take-up drums, see FIG. 5. Both of the cable take-up drums 33, 35 are wound with cable means 41, 43. The cable means 41, 43 extend outwardly in parallel manner and are threaded around their respective pulleys 17, 15 and are tied at their ends to the elevator lift bar 45 which is integrally connected to a lift frame 22 underlying the floor plate 21 of the elevator carriage 19, frame 22 being hingedly connected at 22a to the forward end of the floor plate (FIG. 3).

As best shown in FIG. 1, the forward flanges 3a, 5a run in continuous manner from the bottom of each vertical channel member 3, 5 to the upper most portion thereof. The rearward flanges 3b, 5b, however (see FIGS. 1, 3 and particularly FIG. 4) are interrupted by openings or windows 47, 49, respectively. Aligned with the lower edges 47a, 49a of the respective windows are rearwardly and upwardly inclined tilting rails 51, 53 (see FIGS. 2–4). The tilting rails have respective upper wheel bearing surfaces 51a, 53a thereon (FIGS. 1 and 2). The rails are fixedly connected, as by welding, to the vertical channel members so that the wheel bearing surfaces 51a and 53a are aligned with the portions of the related flange means 3b, 5b which define the lower edges of windows 47, 49, respectively.

In view of the aforedescribed structure it will be recognized that due to the positional connection of cables 41, 43 to lift bar 45 there is constantly exerted a counterclockwise rotative force on elevator carriage 19 about the upper wheel set 29 when the carriage 19 is being lifted. As a result of this rotational force the lower wheel set 31 will always tend to ride against the inner faces of channel flanges 3b and 5b (see FIGS. 2–4) until the wheels 31 reach the windows 47, 49, whereupon they will begin to move outwardly on bearing surfaces 51a, 53a of the tilting rails 51, 53. The upper wheel set 29 of the elevator carriage will, because of the horizontal force component of the counterclockwise movement, bear against and ride on the inner faces of channel flanges 3a, 5a at all times during operation of the lift and dump mechanism. A cross bar 54 is mounted between beam members 3, 5 at an elevation above rails 51, 53 such as to function as rest or pivot for the upper portion of the containers to be dumped, as will appear subsequently.

With reference to FIGS. 1 and 2, there is shown a conventional vibrating screen 64 and belt conveyor 66 for use with the improved lift and dump mechanism of the present invention. Vibrating screen or shaker 64 and belt 66 do not form a part of the present invention and are included primarily for illustrative purposes. As shown, shaker 66 is adapted to receive materials transported in the containers or barrels 61 after the barrels have been lifted to the appropriate height and dumped. The shaker is suitably supported in a downwardly and forwardly inclined position by means of hanger rods 69 from a pair of support arms 63, 65 extending from the channel members 3, 5, respectively. With the slanted surface so provided, as the table vibrates, the natural forces of gravity cause larger pieces of the material dumped from container 61 to move down the table while the smaller pieces are falling through the screen into the shaker funnel 75 and into a receptable barrel 77 positioned therebeneath. Vibration of the table is created by a U-shaped yoke 79 having the legs 79a and b fixedly connected to the side frame of the screen or table 64. Operatively connected to the yoke of the table is a vibrating motor 87 supplied with electric current through cable leading to a control box 83.

Operation of the improved lift and dump mechanism occurs in the following manner. The elevator carriage is moved downwardly to the floor by operation of appropriate switches in control box 83 which is connected by conventional circuitry for actuation of the motors 37, 39 as best shown in FIGS. 1 and 2. With the elevator carriage in position on the floor, a container 61 of unprocessed material or scrap, shown in broken lines in FIG. 1, is appropriately positioned on the floor plate 21 of the carriage and secured therein by a belt of chain means 61a (FIG. 2) so that upon subsequent dumping of the barrel, the barrel itself cannot slide from the elevator carriage. Each end of the chain 61a may be removably secured to the wall plate 23 in any suitable manner. Upon actuation of the controls, rotational motion of the cable take-up drums is initiated thus causing a winding of the cables 41, 43. Due to the connection of the elevator cables 41, 43 to the lift bar 45 at the outer edge of the elevator carriage, lifting of the carriage causes an inherent counterclockwise rotational force to be imparted to the elevator carriage. However, confinement of the rollers between the channel flanges 3b, 5b, will preclude anything but upward movement of the elevator carriage during initial stages of its movement. The carriage, therefore, is simply lifted upwardly with the upper wheels running on the flanges 3a, 5a and the lower wheels running on flanges 3b, 5b. The diameters of the wheels being only slightly less than the width of the channels, no substantial tilting movement of the carriage occurs until the lower wheels 31 move to a point opposite the windows 47, 49. The upper wheels 29 at all times ride against the beam flanges 3a, 5a only. As the lower wheels of the carriage reach the windows, the counterclockwise rotational force imparted to the carriage by the cables causes the lower end of the carriage carrying floor plate 21 and liftframe 22 to move outwardly on the wheel bearing surfaces of tilting rails 51, 53. It will be recognized that as the carriage rolls outwardly on the tilting rails upward movement of the upper wheel set 29 has substantially decreased but not stopped. During the roll out of the lower wheel set on the rails it may be clearly visualized that the barrel itself is being tilted towards an emptying position, see FIG. 1. As the carriage is elevated, the upper end of barrel 61 will move above cross bar 54 and then as the lower end of the carriage moves out over rails 51, 53, the resulting forward tilting of the upper end of the barrel will cause the latter to ride over the top of the cross bar which will then serve as a pivot over which the barrel will be rotated as its lower end is lifted out and upwardly. It will similarly be recognized that the degree of tilting obtainable in this interim tilting stage can be varied by changing the angle of the tilting rails 51, 53. It has been found that an angle of from about 45° to 60° to the vertical provides for satisfactory results in the initial tilting stage, but this may, of course, be varied in accordance with the desired results.

In order to dump the contents of the container onto the shaker table it may be necessary to raise the container to an angle greater than that provided for by the length of the tilting rails. Dumping beyond the angle provided by the rails may be accomplished by actuating the drive motor after the wheels have run to the end of the rails so as to pull the lifting bar of the elevator carriage upwardly still farther in order to raise the lower wheel set off the tilting rails. In so doing, cross bar 54 supporting the upper end of the barrel and the resisting force of beam flanges 3a, 5a against the upper wheels 29 creates a pivot point about which the barrel 61 can rotate. Also, as best seen in FIG. 2, the hinged connection 22a of liftframe 22 at the forward edge of floor plate 21 will allow the carriage and barrel 61 to swing forwardly relative to liftframe 22 when the vertical movement of the rearward end of the carriage has lifted wheels 31 above the tilting rails. The barrel may thus be tipped to any desired angle above the horizontal so as to assume rapid and complete dumping of the contents. As shown in FIG. 2 a dumping position at an angle of 20° or more above the horizontal may be obtained readily in this manner, thus insuring complete emptying of the contents from the container. Upon emptying of the container, the drive motors can be reversed so as to unwind the cables and reverse the movements of the elevator carriage to return the latter to the position initially illustrated in FIG. 1, where the emptied container may be removed and replaced by another which has been filled with material to be dumped.

The material ejected from the container 61 onto shaker screen 64, will, in response to the vibrational motion imparted thereto, be separated from the smaller particles which will fall through the screen into barrel 77. Acceptable material retained in the screen will move down the screen and fall on conveyor belt 66 where inspection, classification, or other processing may take place.

While a preferred embodiment of the invention has been shown and described, many modifications thereof can be made by one skilled in the art without departing from the spirit of the invention and it is desired, therefore, to protect by Letters Patent all forms of the invention defined within the scope of the appended claims.

That which is claimed and desired to be secured by United States Letters Patent is:

1. In a lift and dump device for moving a container from a first loading position to an elevated second position at which the container is unloaded, said device comprising:
   (a) upwardly directed frame means for receiving and guiding a load platform which supports the container, said frame means defining a plane in which said platform reciprocally moves in an ascending-descending manner,
   (b) drive means operatively connected to said load platform for moving it between said first and second positions, and
   (c) tilt means operatively associated with the frame and said drive means for imparting dumping motion to said load platform as it approaches said second position, the plane of said frame means containing the axis of rotation of said dumping motion; said tilt means including a lift frame member underlying said platform having its forward end portion hingedly connected to said platform and its rearward end to said drive means.

2. The lift and dump device of claim 1 in which said frame means includes:
   (a) guide tracks, and
   (b) said platform includes first and second frame engaging means, the frame engaging means of the platform movably engaging said guide tracks so as to positively determine the movement path of the platform when it is being raised or lowered.

3. The lift and dump device of claim 2 in which the tilt means includes:
   (a) a tilt track disposed angularly, outwardly and upwardly with respect to at least one of said guide tracks, said tilt track also being disposed in the plane of and in communication with said one of said guide tracks, and
   (b) said second frame engaging means adapted to engage that guide track communicating with said tilt track so as to positively determine the movement path of the platform as it tilts to a dumping position.

4. The lift and dump device of claim 1 in which said drive means includes a lift cable which is connected to the load platform at a point remote from the frame means so as to thereby exert a continuous rotary moment to said platform as it is being moved upwardly.

5. The lift and dump device of claim 4 in which said frame means includes:
   (a) guide tracks, and
   (b) said platform includes first and second frame engaging means, the frame engaging means of the platform movably engaging said guide tracks so as to positively determine the movement path of the platform when it is being raised or lowered.

6. The lift and dump device of claim 5 in which the tilt means includes:
   (a) a tilt track disposed angularly, outwardly and upwardly with respect to at least one of said guide tracks, said tilt track also being disposed in the plane of and in communication with said one of said guide tracks, and
   (b) said second frame engaging means adapted to engage that guide track communicating with said tilt track so as to positively determine the movement path of the platform as it tilts to a dumping position.

7. A lift and dump device comprising:
   (a) a frame including vertically disposed spaced apart, parallel beam members having front and rear spaced flanges defining vertically extending guide channels;
   (b) a carriage including a rearwardly extending load-supporting platform mounted for vertical movement in said frame between a lower loading position and an upper dumping position;
   (c) said carriage including vertically spaced upper and lower sets of laterally spaced rollers guidingly received in the respective channels;
   (d) upwardly inclined tilting rails extending rearwardly from said beam members;
   (e) openings in the rear flange of said beam members aligned with said tilting rails and formed to allow passage therethrough of said lower set of rollers upon elevation of said carriage to a position at which said lower set of rollers is in registration with said openings;
   (f) hoisting means mounted on said frame for elevating and lowering the carriage between said positions; and
   (g) connection means between the hoisting means and the carriage arranged to tilt said carriage forwardly about said upper rollers during its upward movement; said connection means including a lift frame member underlying said platform having its forward end portion hingedly connected to the carriage and its rearward end portion secured to said hoisting means.

8. A lift and dump device according to claim 7 wherein said hoisting means include:
 (a) cable-holding drum means;
 (b) flexible cable wound on said drum means and connected to said lift frame; and
 (c) reversible electric motor means drivingly connected to said drum means.

References Cited
UNITED STATES PATENTS

| | | | |
|---|---|---|---|
| 1,781,211 | 11/1930 | Beaumont | 214—709 |
| 2,573,958 | 11/1951 | Eaddy | 214—313 |
| 3,279,635 | 10/1966 | Avery et al. | 214—313 |

HUGO O. SCHULZ, Primary Examiner